(12) United States Patent
Adachi

(10) Patent No.: US 10,028,241 B2
(45) Date of Patent: Jul. 17, 2018

(54) COMMUNICATION CONTROL METHOD, UPPER NETWORK APPARATUS, AND RADIO BASE STATION

(71) Applicant: KYOCERA CORPORATION, Kyoto (JP)

(72) Inventor: Hiroyuki Adachi, Kawasaki (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 15/125,862

(22) PCT Filed: Mar. 20, 2015

(86) PCT No.: PCT/JP2015/058588
§ 371 (c)(1),
(2) Date: Sep. 13, 2016

(87) PCT Pub. No.: WO2015/141848
PCT Pub. Date: Sep. 24, 2015

(65) Prior Publication Data
US 2017/0006565 A1 Jan. 5, 2017

(30) Foreign Application Priority Data

Mar. 20, 2014 (JP) .................................. 2014-059280

(51) Int. Cl.
*G01R 31/08* (2006.01)
*H04L 5/14* (2006.01)
(Continued)

(52) U.S. Cl.
CPC ......... *H04W 56/002* (2013.01); *H04L 49/201* (2013.01); *H04W 8/005* (2013.01);
(Continued)

(58) Field of Classification Search
CPC .......... H04W 56/0025; H04W 68/005; H04W 72/005; H04W 72/04
See application file for complete search history.

(56) References Cited

U.S. PATENT DOCUMENTS

2009/0219875 A1* 9/2009 Kwak .................. H04B 7/2615
370/329
2012/0117155 A1 5/2012 Li et al.
(Continued)

FOREIGN PATENT DOCUMENTS

JP 2014-500658 A 1/2014

OTHER PUBLICATIONS

Method and Apparatus for Resource Allocations to Support Peer-To-Peer Communications in Cellular Networks, (JP2014500658), Published on Jan. 1, 2015.*
(Continued)

*Primary Examiner* — Faruk Hamza
*Assistant Examiner* — Abu-Sayeed Haque
(74) *Attorney, Agent, or Firm* — Studebaker & Brackett PC

(57) ABSTRACT

A communication control method for performing device-to-device communication between different cells managed by an eNB 200 connected to an OAM 400, comprises: setting, by the OAM 400, in a predetermined cell managed by the eNB 200, an MBSFN area where synchronization is achieved between a plurality of cells; notifying, by the OAM 400, to the eNB 200, a radio resource that is common in the MBSFN area, and that is used for performing the device-to-device communication; and a step of broadcasting, by the eNB 200, the radio resource in the predetermined cell.

6 Claims, 13 Drawing Sheets

(51) Int. Cl.
| | |
|---|---|
| H04B 7/00 | (2006.01) |
| H04L 12/28 | (2006.01) |
| H04J 3/00 | (2006.01) |
| H04W 56/00 | (2009.01) |
| H04W 8/00 | (2009.01) |
| H04L 12/931 | (2013.01) |
| H04W 72/12 | (2009.01) |
| H04W 28/16 | (2009.01) |
| H04W 76/14 | (2018.01) |
| H04L 12/70 | (2013.01) |
| H04W 88/08 | (2009.01) |
| H04W 88/12 | (2009.01) |
| H04W 88/16 | (2009.01) |

(52) U.S. Cl.
CPC .......... *H04W 28/16* (2013.01); *H04W 56/00* (2013.01); *H04W 72/1215* (2013.01); *H04W 76/14* (2018.02); *H04L 2012/5625* (2013.01); *H04W 88/08* (2013.01); *H04W 88/12* (2013.01); *H04W 88/16* (2013.01)

(56) References Cited

U.S. PATENT DOCUMENTS

| | | | | |
|---|---|---|---|---|
| 2013/0188546 A1* | 7/2013 | Turtinen | ............... | H04W 8/005 370/312 |
| 2015/0131510 A1* | 5/2015 | Gilbert | ............... | H04W 72/005 370/312 |
| 2015/0215879 A1* | 7/2015 | Zhu | ................... | H04W 56/0015 370/350 |
| 2015/0229486 A1* | 8/2015 | Kotecha | ................ | H04L 12/189 370/312 |
| 2015/0282131 A1* | 10/2015 | Nagata | .................. | H04W 16/32 370/329 |
| 2015/0327299 A1* | 11/2015 | Koskinen | ................ | H04W 4/06 370/329 |
| 2016/0007361 A1* | 1/2016 | Andersson | ............ | H04L 5/0053 370/329 |
| 2016/0057708 A1* | 2/2016 | Siomina | .............. | H04W 52/243 455/452.2 |
| 2016/0073370 A1* | 3/2016 | Axmon | ............. | H04W 56/0015 370/350 |
| 2016/0099985 A1* | 4/2016 | Koskinen | .............. | H04L 12/189 370/260 |
| 2016/0119762 A1* | 4/2016 | Zhu | ....................... | H04W 76/28 370/312 |

OTHER PUBLICATIONS

International Search Report issued in PCT/JP2015/058588; dated Jun. 23, 2015.
Written Opinion issued in PCT/JP2015/058588; dated Jun. 23, 2015.
3rd Generation Partnership Project; Technical Specification Group Radio Access Network; Study on LTE Device to Device Proximity Services; Radio Aspects; 3GPP TR 36.843 V1.2.0; Feb. 2014; pp. 1-49; Release 12; 3GPP Organizational Partners.
CATT; CSMA or Coordinated Access based Resource Allocation for D2D Communication; 3GPP TSG RAN WG2 Meeting #84; R2-134061; Nov. 11-15, 2013; pp. 1-7; San Francisco, USA.
Kyocera; Consideration of Inter-cell D2D Service; 3GPP TSG-RAN WG2 #85bis; R2-141386; Mar. 31-Apr. 4, 2014; pp. 1-5; Valencia, Spain.

* cited by examiner

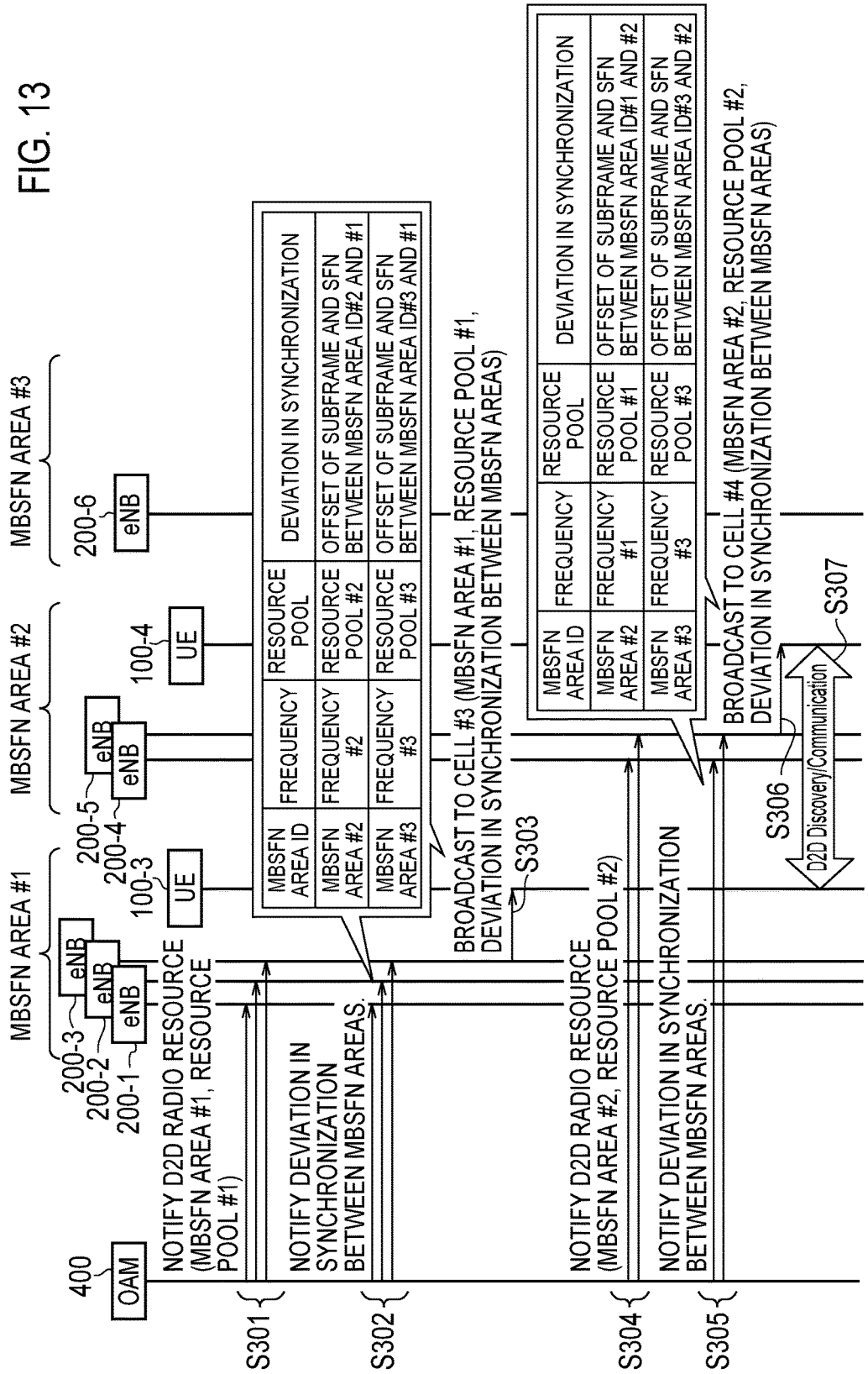

FIG. 14

D2D-AreaInfoList information element

```
-- ASN1START servAreaInfoList-r12    ::=     SEQUENCE (SIZE(1..maxD2D-Area)) OF D2D-AreaInfo-r12
neighAreaInfoList-r12   ::=     SEQUENCE (SIZE(1..maxD2D-Area)) OF D2D-AreaInfo-r12
syncAreaInfo-r12        ::=     D2D-SyncAreaInfo-r12

D2D-AreaInfo-r12        ::=     SEQUENCE {
        areaId-r12                      MBSFN-Area-ID-r9,
        dl-CarrierFreq                  ARFCN-ValueEUTRA,
        dl-Bandwidth                    ENUMERATED {n6, n15, n25, n50, n75, n100}
        resourcePoolInfo-r12            D2D-ResourcePoolInfo-r12
        ...
}

D2D-ResourcePoolInfo-r12  ::=   SEQUENCE {
        discovery-pool-r12              D2D-resource-pool-r12
        communication-pool-r12          D2D-resource-pool-r12
        ...
}

D2D-resource-pool-r12   ::=     SEQUENCE {
        pool-Freq-r12                   BIT STRING (SIZE (13))
        pool-startSFN-r12               INTEGER (0..1023)
        pool-durationSFN-r12            INTEGER (0..1023)
        pool-periodicitySFN-r12         INTEGER (0..1023)
        ...
}

D2D-SyncAreaInfo-r12            SEQUENCE {
        areaIdList-r12                  SEQUENCE (SIZE(1..maxD2D-Area)) OF D2D-AreaID,
        neighArea-TimeGapInfoList-r12   SEQUENCE (SIZE(1..maxD2D-Area)) OF
NeighArea-TimeGapInfo-r12       OPTIONAL,    -- Need OP,
        ...
}

NeighArea-TimeGapInfo-r12  ::=  SEQUENCE {
        areaID-r12                      MBSFN-Area-ID-r9,
        offset-Subframe-r12             INTEGER (0..9)
        offset-SFN-r12                  INTEGER (0..1023)
        ...
}

MBSFN-Area-ID-r9        ::=     INTEGER (0..255)

-- ASN1STOP
```

FIG. 15

| D2D-AreaInfoList field descriptions |
|---|
| servAreaInfoList<br>MBSFN AREA LIST PROVIDED BY SELF CELL FOR D2D |
| neighAreaInfoList<br>MBSFN AREA LIST PROVIDED BY ANOTHER CELL FOR D2D |
| syncAreaInfo<br>INFORMATION ON MBSFN SYNCHRONIZATION AREA APPLIED TO SELF CELL |
| discovery-pool<br>INFORMATION ON RESOURCE POOL FOR DISCOVERY |
| communication-pool<br>INFORMATION ON RESOURCE POOL FOR COMMUNICATION |
| pool-Freq<br>SIZE IN FREQUENCY DIRECTION OF RESOURCE POOL (RB) |
| pool-startSFN<br>ASSUME TO DESCRIBE SFN AT START POSITION OF RESOURCE POOL, OR THE SMALLEST NUMBER AT START POSITION OF SFN WHEN RESOURCE POOL IS REPEATED |
| pool-durationSFN<br>SIZE IN TIME DIRECTION OF RESOURCE POOL (SFN) |
| pool-periodicitySFN<br>REPEAT INTERVAL OF RESOURCE POOL (SFN). WHEN RESOURCE POOL IS NOT CONTAINED IN UPPER LIMIT VALUE (1024) OF SFN IN REPEATING, THAT RESOURCE POOL IS NOT SET. |
| neighArea-TimeGapInfoList<br>LIST OF TIME OFFSET INFORMATION BETWEEN EACH ADJACENT MBSFN AREA |
| offset-Subframe<br>OFFSET VALUE OF SUBFRAME (SUBFRAME) |
| offset-SFN<br>OFFSET VALUE OF SFN (SFN) |

COMMUNICATION CONTROL METHOD, UPPER NETWORK APPARATUS, AND RADIO BASE STATION

TECHNICAL FIELD

The present invention relates to a communication control method, an upper network apparatus, and a radio base station used in a mobile communication system.

BACKGROUND ART

In 3GPP (3rd Generation Partnership Project) which is a project aiming to standardize a mobile communication system, the introduction of a Device to Device (D2D) service is discussed as a new function in Release 12 and later (see Non Patent Document 1). The D2D service (D2D ProSe) includes the discovery of a proximal terminal (Discovery) and device-to-device communication (Communication).

Here, a D2D radio resource (resource pool) that is used in a D2D service and is decided beforehand within a cell is used in the D2D service within the same cell (an Intra-cell D2D service).

On the other hand, in order to perform a D2D service between different cells (an Inter-cell D2D service), synchronization between different cells and sharing of the D2D radio resources are necessary.

PRIOR ART DOCUMENT

Non-Patent Document

Non Patent Document 1: 3GPP technical report "TR 36.843 V1.2.0" Mar. 10, 2014

SUMMARY

A communication control method according to a first aspect is a method for performing device-to-device communication between different cells managed by a radio base station connected to an upper network apparatus. The communication control method comprises: setting, by the upper network apparatus, to a predetermined cell managed by the radio base station, an MBSFN area where synchronization is achieved between a plurality of cells; notifying, by the upper network apparatus, to the radio base station, a radio resource that is common in the MBSFN area, and that is used for performing the device-to-device communication; and broadcasting, by the radio base station, the radio resource in the predetermined cell.

An upper network apparatus according to a second aspect is connected to a radio base station that manages different cells in which device-to-device communication is performed. The upper network apparatus comprises: a controller configured to set an MBSFN area, where synchronization is achieved between a plurality of cells, to a predetermined cell managed by the radio base station. The controller notifies, to the radio base station, a radio resource that is common in the MBSFN area, and that is used for performing the device-to-device communication.

A radio base station according to a third aspect manages different cells in which device-to-device communication is performed. A predetermined cell managed by the radio base station is set an MBSFN area where synchronization is achieved between a plurality of cells. The radio base station comprises a controller configured to broadcast, to the predetermined cell, a radio resource that is notified from an upper network apparatus connected to the radio base station, and that is common in the MBSFN area, and that is used for performing the device-to-device communication.

BRIEF DESCRIPTION OF THE DRAWINGS

FIG. 13 is a sequence diagram according to the third embodiment.
FIG. 14 is a diagram showing an information element of a System Information Block according to an embodiment.
FIG. 15 is a diagram showing a description of an information element of a System Information Block according to the embodiment.

DESCRIPTION OF THE EMBODIMENTS

Here, for synchronization between different cells and sharing of D2D radio resources, it is necessary to perform inter-cell coordination between radio base stations that manage the cells. However, it may not be possible to perform inter-cell coordination using an interface (an X2 interface or an air interface) between radio base stations in the D2D service. This results in a problem that inter-cell coordination cannot be realized, and therefore, it is not possible to start an inter-cell D2D service.

Therefore, in order to resolve the problem described above, an object of the present invention is to provide a communication control method, an upper network apparatus, and a radio base station by which it is possible to share a radio resource used in a D2D service between cells, and thus execute the D2D service between different cells.

Hereinafter, with reference to the drawings, an embodiment of the present invention will be described.

(System Architecture)

Figure 1:
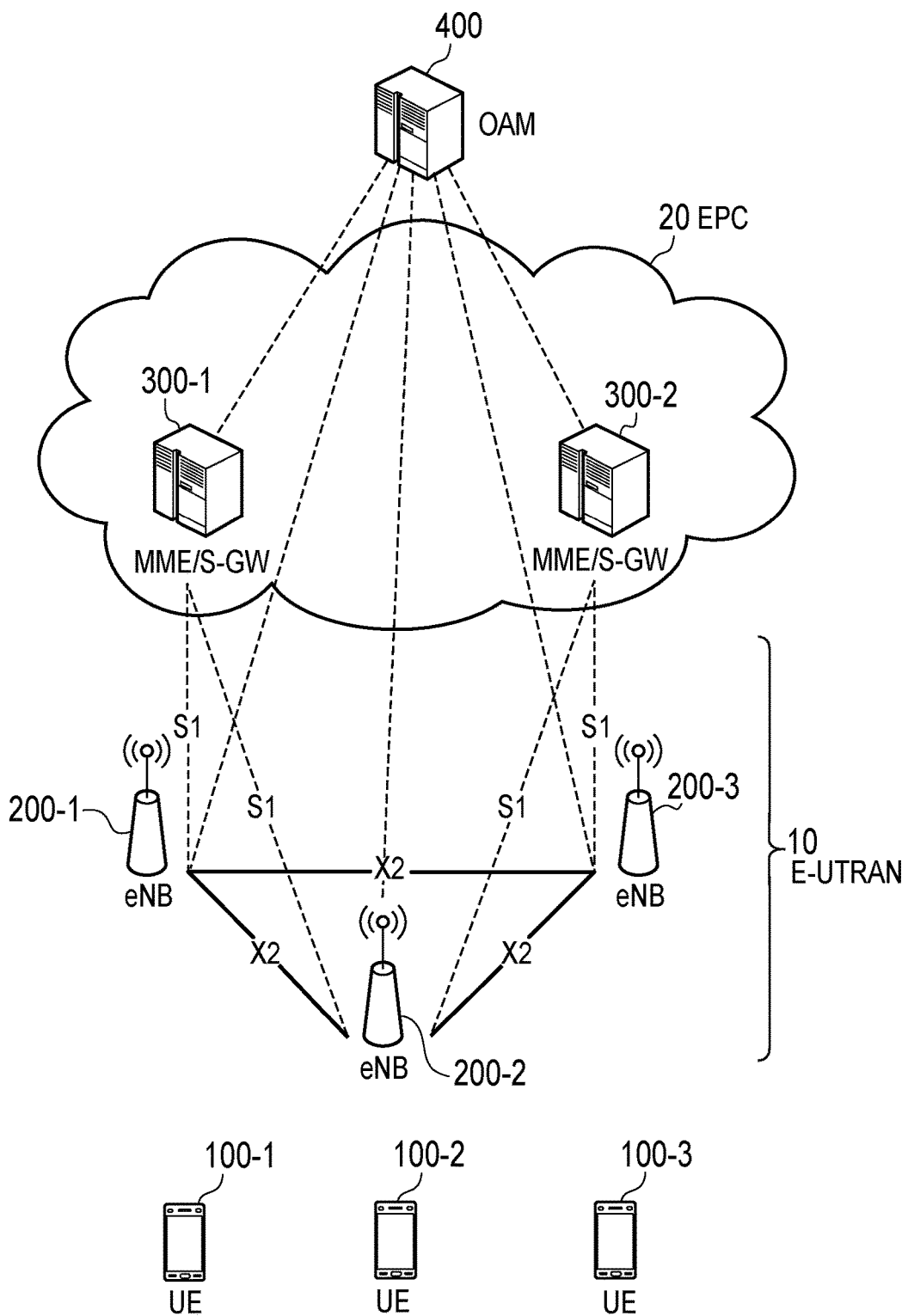
FIG. 1 is a configuration diagram of an LTE system according to an embodiment.

FIG. 1 is an architecture diagram of the LTE system in the embodiment. As illustrated in FIG. 1, the LTE system in the embodiment includes UE (User Equipment) 100, E-UTRAN (Evolved-UMTS Terrestrial Radio Access Network) 10, EPC (Evolved Packet Core) 20 and OAM (Operation Administration and Maintenance) 400.

The UE 100 corresponds to a user terminal. The UE 100 is a mobile communication device, which performs radio communication with a cell (a serving cell) with which a connection is established. The architecture of the UE 100 will be described later.

The E-UTRAN 10 corresponds to a radio access network. The E-UTRAN 10 includes eNB 200 (evolved Node-B). The eNB 200 corresponds to a radio base station. The eNBs 200 are connected mutually via an X2 interface. The architecture of the eNB 200 will be described later.

The eNB 200 manages one or a plurality of cells, and performs radio communication with the UE 100 that establishes a connection with a cell of the eNB 200. The eNB 200 has a radio resource management (RRM) function, a routing function of user data, a measurement control function for mobility control and scheduling and the like. The "cell" is used as a term indicating a smallest unit of a radio communication area, and is also used as a term indicating a function of performing radio communication with the UE 100.

The EPC 20 corresponds to a core network. A network of the LTE system (LTE network) is configured by the E-UTRAN 10 and the EPC 20. The EPC 20 includes MME (Mobility Management Entity)/S-GW (Serving-Gateway) 300. The MME 300 performs different types of mobility control and the like for the UE 100. The SGW performs transfer control of the user data. The MME/S-GW 300 is connected to the eNB 200 via an S1 interface.

The OAM 400 corresponds to an upper network apparatus included in an upper network relative to the eNB 200. The OAM 400 is an operation and maintenance management apparatus. The OAM 400 is connected to the eNB 200 and the MME/S-GW 300, to monitor and change settings of the eNB 200 and the MME/S-GW 300. Further, the OAM 400 communicates with the eNB 200 through the MME/S-GW 300 when the OAM 400 is not directly connected to the eNB 200. Further, the upper network includes the core network. Therefore, the upper network apparatus may also be included in the core network.

Figure 2:
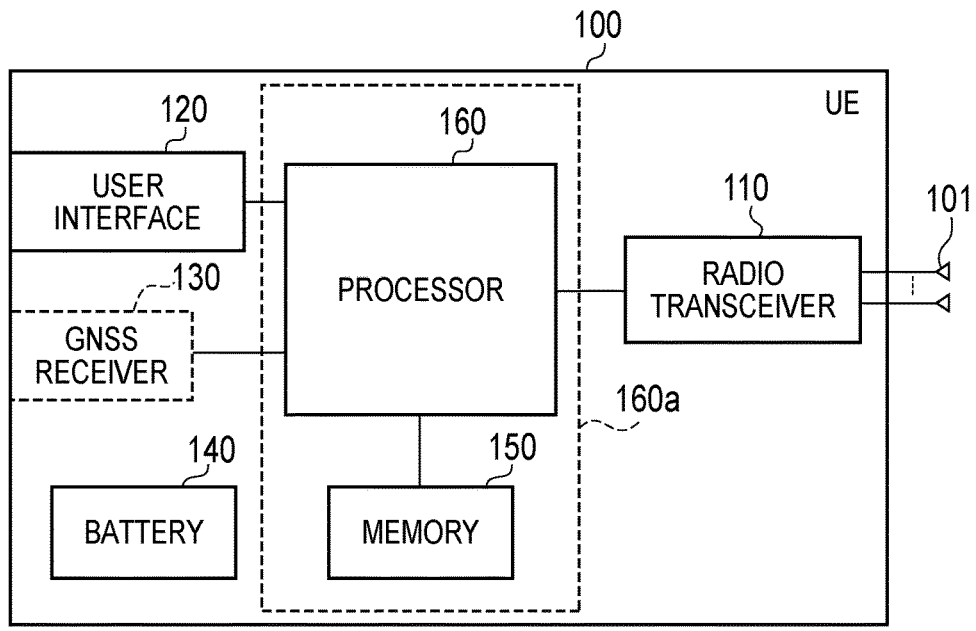
FIG. 2 is a block diagram of a UE according to the embodiment.

FIG. 2 is a block diagram of the UE 100. As illustrated in FIG. 2, the UE 100 includes plural antennas 101, a radio transceiver 110, a user interface 120, a GNSS (Global Navigation Satellite System) receiver 130, a battery 140, a memory 150, and a processor 160. The memory 150 corresponds to a storage. The processor 160 corresponds to a controller. The UE 100 may not necessarily include the GNSS receiver 130. Furthermore, the memory 150 may be integrally formed with the processor 160, and this set (that is, a chip set) may be called a processor 160 a.

The plural antennas 101 and the radio transceiver 110 are used to transmit and receive a radio signal. The radio transceiver 110 converts a baseband signal (a transmission signal) output from the processor 160 into a radio signal, and transmits the radio signal from the plural antennas 101. Furthermore, the radio transceiver 110 converts a radio signal received by the plural antennas 101 into a baseband signal (a reception signal), and outputs the baseband signal to the processor 160.

The user interface 120 is an interface with a user carrying the UE 100, and includes, for example, a display, a microphone, a speaker, various buttons and the like. The user interface 120 receives an operation from a user and outputs a signal indicating the content of the operation to the processor 160. The GNSS receiver 130 receives a GNSS signal in order to obtain location information indicating a geographical location of the UE 100, and outputs the received signal to the processor 160. The battery 140 accumulates a power to be supplied to each block of the UE 100.

The memory 150 stores a program to be executed by the processor 160 and information to be used for processing by the processor 160. The processor 160 includes a baseband processor that performs modulation and demodulation, encoding and decoding and the like on the baseband signal, and a CPU (Central Processing Unit) that performs various processes by executing the program stored in the memory 150. The processor 160 may further include a codec that performs encoding and decoding on sound and video signals. The processor 160 executes various processes and various communication protocols described later.

Figure 3:
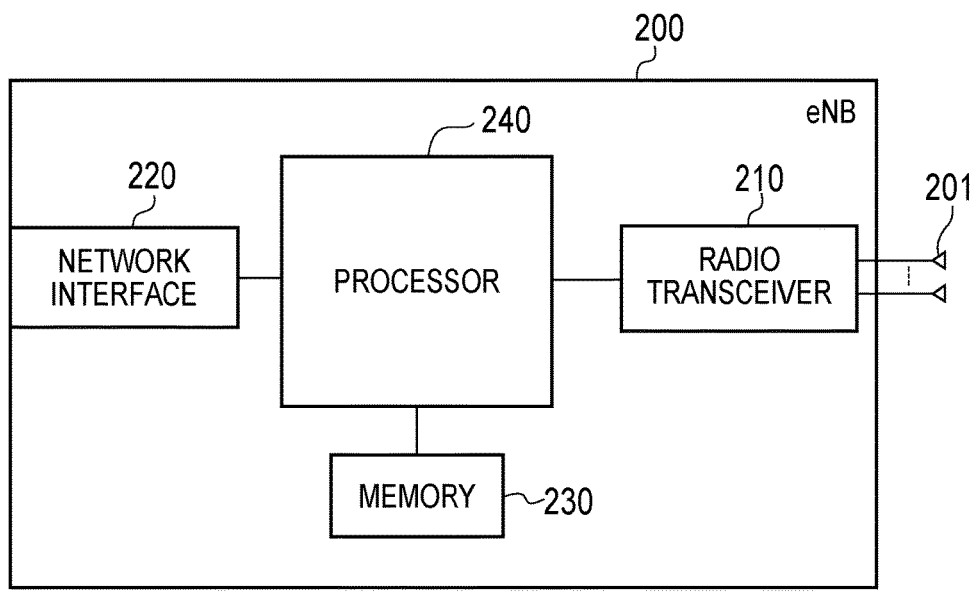
FIG. 3 is a block diagram of an eNB according to the embodiment.

FIG. 3 is a block diagram of the eNB 200. As illustrated in FIG. 3, the eNB 200 includes plural antennas 201, a radio transceiver 210, a network interface 220, a memory 230, and a processor 240.

The plural antennas 201 and the radio transceiver 210 are used to transmit and receive a radio signal. The radio transceiver 210 converts a baseband signal (a transmission signal) output from the processor 240 into a radio signal, and transmits the radio signal from the plural antennas 201. Furthermore, the radio transceiver 210 converts a radio signal received by the plural antennas 201 into a baseband signal (a reception signal), and outputs the baseband signal to the processor 240.

The network interface 220 is connected to the neighboring eNB 200 via the X2 interface and is connected to the MME/S-GW 300 via the S1 interface. The network interface 220 is used in communication performed on the X2 interface and communication performed on the S1 interface.

The memory 230 stores a program to be executed by the processor 240 and information to be used for processing by the processor 240. The processor 240 includes a baseband processor that performs modulation and demodulation, encoding and decoding and the like on the baseband signal and a CPU that performs various processes by executing the program stored in the memory 230. The processor 240 executes various processes and various communication protocols described later.

Figure 4:
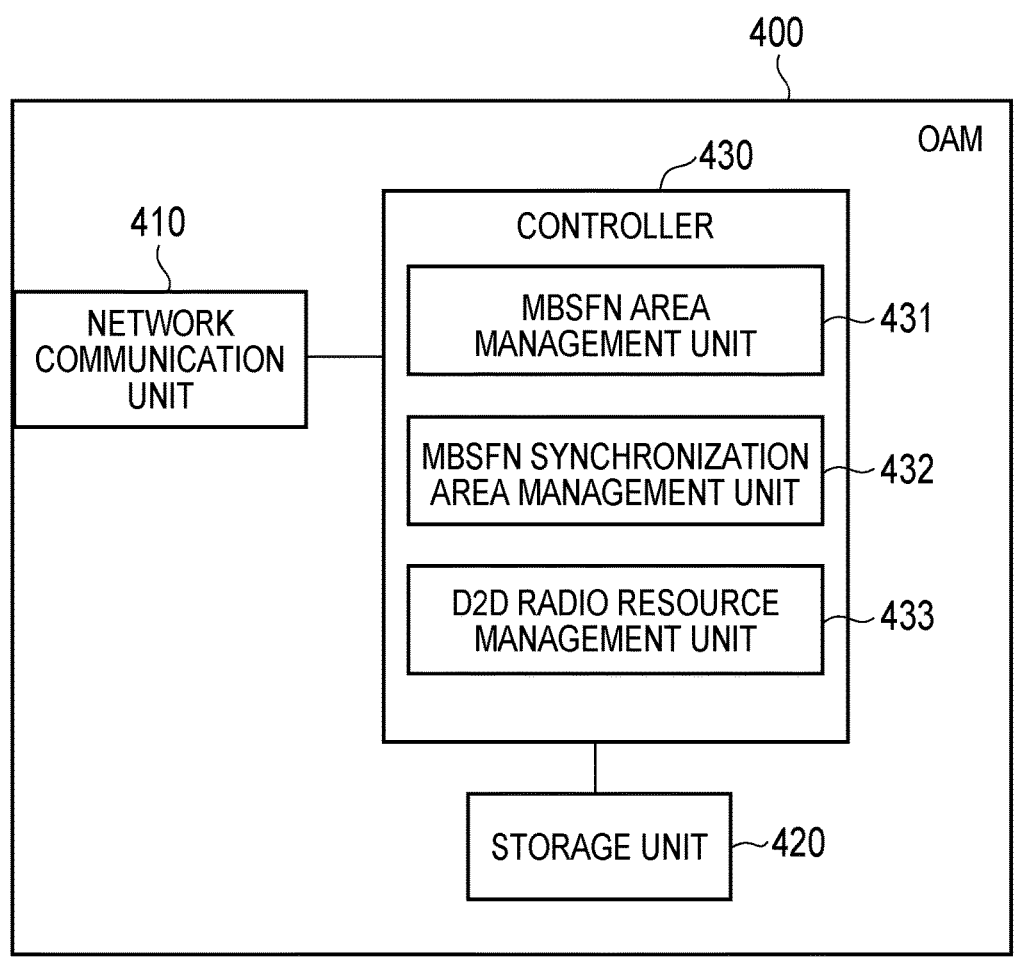
FIG. 4 is a block diagram of an OAM according to the embodiment.

FIG. 4 is a block diagram of the OAM 400. As shown in FIG. 4, the OAM 400 includes a network communication unit 410, a storage unit 420, and a controller 430.

The network communication unit 410 communicates with the eNB 200 and the MME/S-GW 300. The storage unit 420 is configured by using a memory, for example, and stores various types of information used for control and the like of the operation administration and maintenance device OAM. The controller 430 is configured by using a CPU, for example, and controls various types of functions provided in the OAM 400.

The controller 430 includes an MBSFN (Multimedia Broadcast Multicast service Single Frequency Network) area management unit 431, an MBSFN synchronization area management unit 432, and a D2D radio resource management unit 433.

The MBSFN area management unit 431 performs management by associating a cell managed by the eNB 200 and an MBSFN area ID (MBSFN area identification information) that uniquely identifies an MBSFN area. The MBSFN area management unit 431 transmits a setting signal including the MBSFN area ID to the eNB 200, via the network communication unit 410, and sets the MBSFN area. The details of the MBSFN area will be described later.

The MBSFN synchronization area management unit 432 performs management by associating a cell managed by the eNB 200 and an MBSFN synchronization area ID that uniquely identifies an MBSFN synchronization area. It is noted that the MBSFN synchronization area management unit 432 may also perform management by associating an MBSFN synchronization area ID with an MBSFN area. The MBSFN synchronization area management unit 432 transmits a setting signal including the MBSFN synchronization area ID to the eNB 200, via the network communication unit 410, and sets the MBSFN synchronization area.

(MBSFN Area/MBSFN Synchronization Area)

Figure 5:
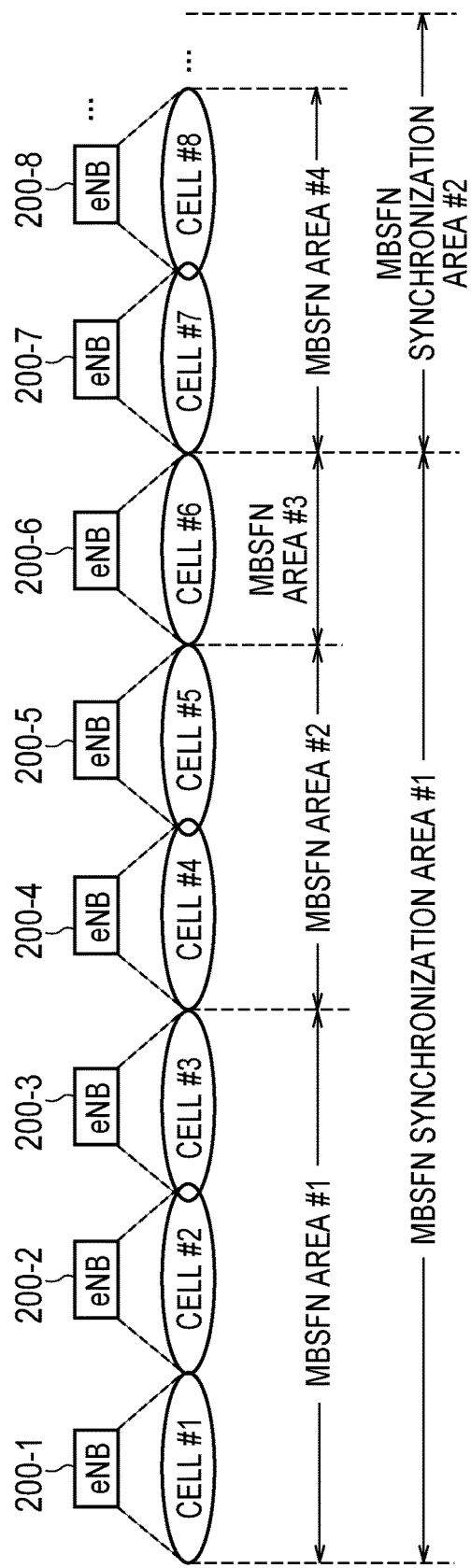
FIG. 5 is a diagram showing a relationship between an MBSFN area and an MBSFN synchronization area according to the embodiment.

Here, the MBSFN area, the MBSFN synchronization area, and the relationship therebetween will be described by using FIG. 5. FIG. 5 is a diagram showing a relationship between an MBSFN synchronization area and an MBSFN area.

The MBSFN area is an area where synchronization is achieved between cells in MBMS (Multimedia Broadcast and Multicast Service) service, which is a broadcasting service using a common channel. Synchronization between cells implies that each cell is operating under the same standard of time. In the example shown in FIG. 5, an MBSFN area #1 is set to a cell #1, a cell #2, and a cell #3, which are predetermined cells managed by eNBs 200-1, 2, and 3, respectively. Similarly, an MBSFN area #2 is set to a cell #4 and a cell #5 managed by eNBs 200-4 and 5, respectively. An MBSFN area #3 is set to a cell #6 managed by an eNB 200-6. An MBSFN area #4 is set to a cell #7 and a cell #8 managed by eNBs 200-7 and 8, respectively. Therefore, synchronization is achieved between the cell #1, the cell #2, and the cell #3 in which the MBSFN area #1 is set. It is noted that the number of cells included in the MBSFN area may be any arbitrary number.

The MBSFN synchronization area is an area where synchronization is achieved between MBSFN areas. Synchronization between MBSFN areas implies that each MBSFN area is operating on the basis of the same standard of time. An MBSFN synchronization area includes one or more MBSFN areas. In the example shown in FIG. 5, the MBSFN synchronization area #1 is set to the MBSFN areas #1 through #3. Similarly, the MBSFN synchronization area #2 is set to the MBSFN areas #4 . . . . It is noted that the cells within the MBSFN synchronization area may configure a plurality of MBSFN areas.

The description will be focused back on FIG. 4. The D2D radio resource management unit 433 included in the OAM 400 manages a resource pool, which is a radio resource (a D2D radio resource) used in a D2D service. The D2D radio resource management unit 433 performs management by associating a D2D radio resource with each MBSFN area (MBSFN area ID). Thus, the D2D radio resource management unit 433 notifies the D2D radio resource to the eNB 200 via the network communication unit 410.

The D2D radio resource includes a discovery resource used for the discovery of a proximal terminal that performs device-to-device communication, and a communication resource that is used in the device-to-device communication. The D2D radio resource is information that is broadcast by the eNB 200 to a predetermined cell.

The D2D radio resource may include frequency information related to a frequency resource that is available for or used in the D2D service in a predetermined frequency band. The frequency information is at least one of a resource block number, a resource block range, and a frequency popping pattern.

The D2D radio resource may include time information related to a time resource (a subframe) that is available for or used in the D2D communication in a predetermined frequency band. The time information is at least one of a system frame number, a subframe number, a start/terminate subframe, a transmission period, a transmission interval, and a repetition frequency.

(D2D Service)

Figure 6:
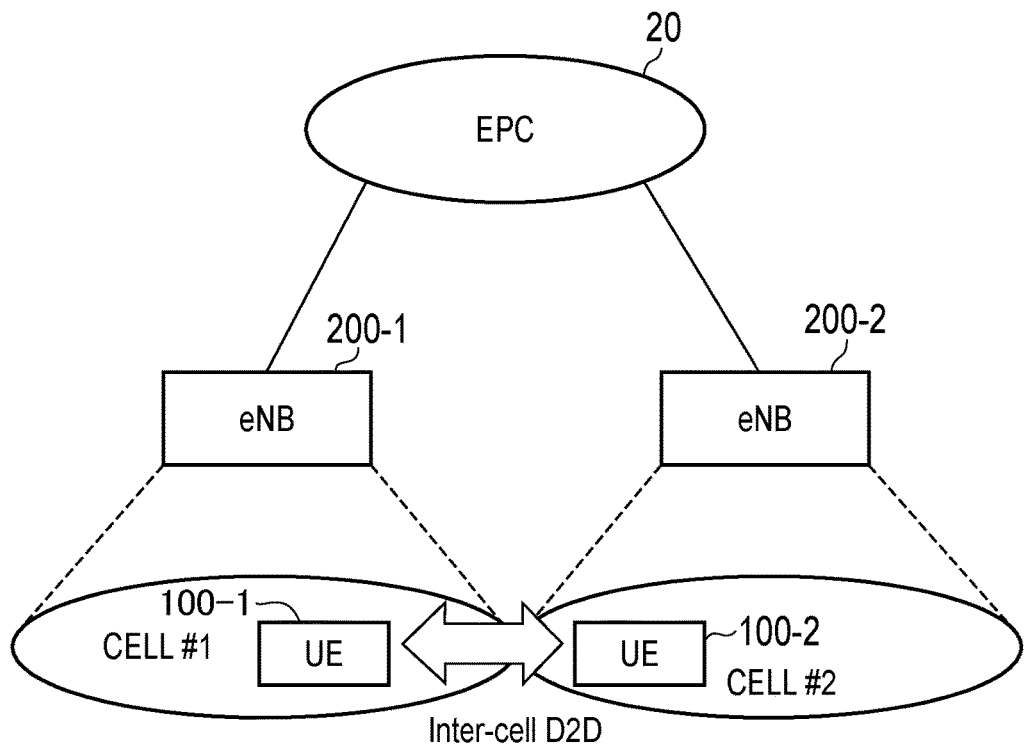
FIG. 6 is a diagram for describing a D2D service according to the embodiment.

An LTE system according to the embodiment supports a D2D service, which is direct device-to-device communication (UE-to-UE communication). FIG. 6 is a diagram for describing a D2D service according to the embodiment.

Here, the D2D service will be described in comparison with cellular communication, which is normal communication of the LTE system. The cellular communication is a communication mode in which a data path is made through a network (an E-UTRAN 10, an EPC 20). The data path is a transmission path for user data.

On the other hand, as shown in FIG. 6, the D2D service is a communication mode in which a data path set between UEs does not pass through the network. A plurality of UEs 100 (UE 100-1 and UE 100-2) adjacent to each other directly perform radio communication.

Thus, as a result of the radio communication performed directly by the plurality of adjacent UEs 100, the fact that the plurality of UEs 100 are adjacent to each other can be detected, and the amount of traffic passing through the EPC 20 can be reduced, in comparison with the cellular communication.

Further, when the plurality of adjacent UEs 100 directly perform radio communication with low transmission power, it is possible to reduce a power consumption of the UE 100 and to reduce interference to a neighboring cell, in comparison with the cellular communication.

A frequency band of the D2D communication may be used commonly with a frequency band of the cellular communication, or may be different from the frequency band of the cellular communication. In the embodiment, in terms of the efficiency of use of a frequency, a case is assumed where a frequency band used in the D2D service is used commonly with the frequency band of the cellular communication.

Further, in the embodiment, as a mode of the D2D service in a lower layer, a broadcast is mainly assumed. For example, CSMA (Carrier Sense Multiple Access) is applied to the D2D service. The D2D communication performed by such a broadcast is especially suitable for public safety application in a time of a disaster or the like. It is noted that the D2D communication can be applied to a group-cast (multicast) or a unicast by performing encryption or the like in an upper layer.

In addition, the D2D service according to the embodiment is a D2D service between different cells (an Inter-cell D2D service). The example in FIG. 6 shows a case in which the UE 100-1 that exists in a cell #1 and the UE 100-2 that exists in a cell #2 perform a D2D service. Further, in the case of the inter-cell D2D service, for example, a device that performs Discovery acquires a D2D radio resource of a cell to be discovered in order to perform Discovery. Moreover, in the case of Communication, for example, a device that is a reception side of the D2D communication acquires a D2D radio resource of the cell of a transmission side, and then performs Communication.

(Radio Frame)

Figure 7:
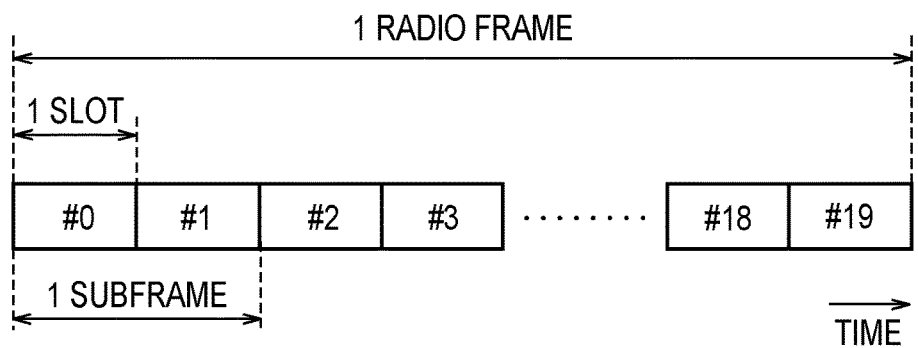
FIG. 7 is a configuration diagram of a radio frame according to the embodiment.

FIG. 7 is a configuration diagram of a radio frame according to the embodiment. The radio frame is configured by 10 subframes arranged in a time direction. Each subframe is configured by two slots arranged in the time direction. Each subframe has a length of 1 ms and each slot has a length of 0.5 ms. Each subframe includes a plurality of resource blocks (RBs) in a frequency direction, and a plurality of symbols in the time direction. Each of the resource blocks includes a plurality of subcarriers in the frequency direction. A resource element is configured by one subcarrier and one symbol. Of the radio resources assigned to the UE 100, a frequency resource is configured by a resource block, and a time resource is configured by a subframe (or a slot).

As described above, in order to perform the inter-cell D2D service, the UE 100 must use the D2D radio resource of another cell. Normally, the UE 100 acquires the D2D radio resource of another cell through inter-cell coordination performed via an X2 interface, but in some cases, it may not be possible to perform communication via the X2 interface.

Therefore, in a first through a third embodiment described below, rather than performing inter-cell coordination via the X2 interface, the procedure for implementing the inter-cell D2D service will be described.

First Embodiment (Operation Overview)

Figure 8:
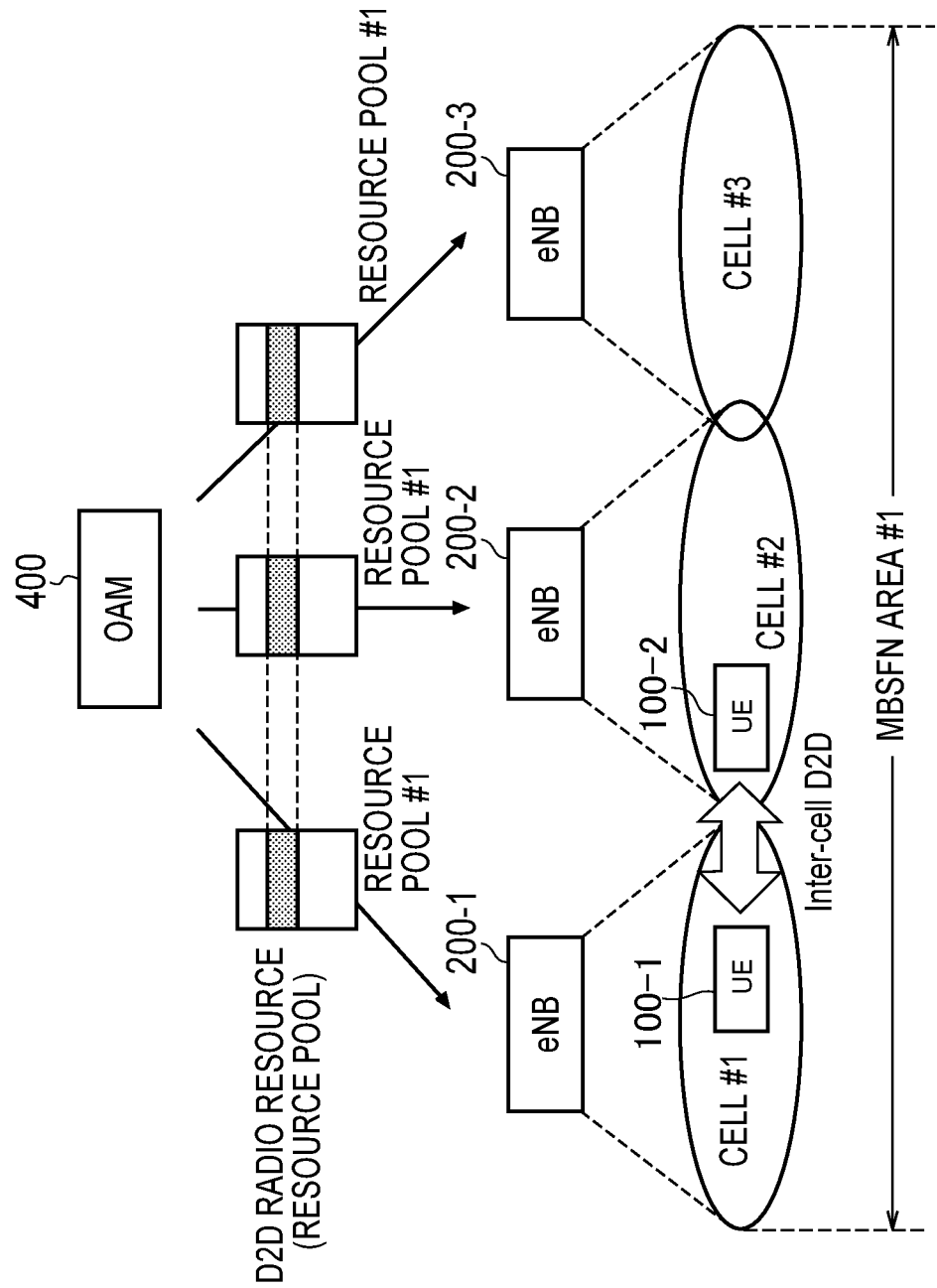
FIG. 8 is a diagram showing an operation overview according to a first embodiment.

FIG. 8 is a diagram for describing an operation overview according to the first embodiment. As shown in FIG. 8, the MBSFN area #1, where synchronization is achieved between cells, is set to the cell #1, the cell #2, and the cell #3, which are managed by the eNBs 200-1, 200-2, and 200-3, respectively.

In the first embodiment, the OAM 400 notifies a resource pool #1, which is a common D2D radio resource, to the eNBs 200-1 through 200-3 that manage the cells #1 through #3 in which the same MBSFN area #1 is set.

Next, the eNBs 200-1 through 200-3 broadcast the resource pool #1 to the cells #1 through #3 managed by the eNBs 200-1 through 200-3, respectively. The resource pool #1, which is the D2D radio resource, is broadcast by being included in an SIB (System Information Block) 13 for MBMS, or in a new SIB for D2D. It is noted that the configuration of the SIB including the D2D radio resource will be described later.

Then, the UE 100-1 that exists in the cell #1 and the UE 100-2 that exists in the cell #2 perform the inter-cell D2D service by using the resource pool #1 that is broadcast within each cell.

(Sequence)

Figure 9:
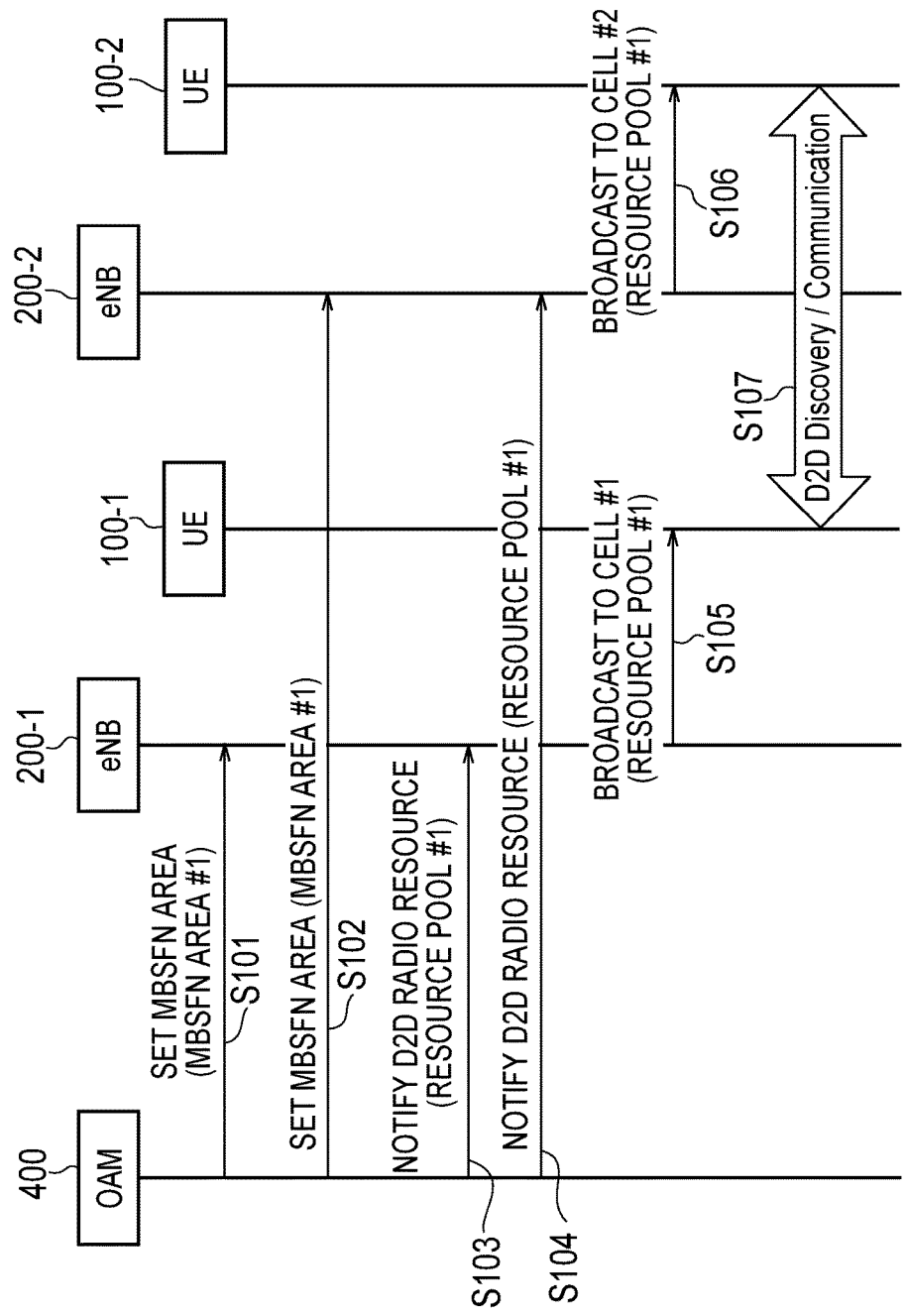
FIG. 9 is a sequence diagram according to the first embodiment.

FIG. 9 is a sequence diagram according to the first embodiment. The example in FIG. 9 shows an operation procedure until the UE 100-1 that exists in the cell #1 managed by the eNB 200-1 and the UE 100-2 that exists in the cell #2 managed by the eNB 200-2 perform the inter-cell D2D service. It is noted that the number of eNBs 200 may be any arbitrary number.

In step S101, the OAM 400 transmits, to the eNB 200-1, a signal including an MBSFN area ID (the MBSFN area #1) to be set to a cell, and sets the MBSFN area. The eNB 200-1 sets the MBSFN area #1 to the cell #1 that the eNB 200-1 manages, on the basis of the received signal.

In step S102, the OAM 400 transmits, to the eNB 200-2, a signal including an MBSFN area ID (an MBSFN area #2) to be set to a cell, and sets the MBSFN area. The eNB 200-2 sets the MBSFN area #1 to the cell #2 that the eNB 200-2 manages, on the basis of the received signal.

As a result, synchronization is achieved between the cell #1 and the cell #2 to which the MBSFN area #1 is set.

In step S103, the OAM 400 notifies, to the eNB 200-1, a D2D radio resource (the resource pool #1) that is common in the MBSFN area #1.

In step S104, the OAM 400 notifies, to the eNB 200-2, a D2D radio resource (the resource pool #1) that is common in the MBSFN area #1.

In step S105, the eNB 200-1 broadcasts the resource pool #1 to the cell #1 managed by the eNB 200-1. The UE 100-1 that exists in the cell #1 receives the broadcast resource pool #1.

In step S106, the eNB 200-2 broadcasts the resource pool #1 to the cell #2 managed by the eNB 200-2. The UE 100-2 that exists in the cell #2 receives the broadcast resource pool #1.

It is noted that a discovery resource and a communication resource are comprised in the D2D radio resource in steps S103 through S106.

In step S107, the UE 100-1 and the UE 100-2 perform D2D Discovery/Communication between different cells by using a D2D radio resource (the resource pool #1) that is common in the MBSFN area #1.

As described above, according to the first embodiment, by setting an MBSFN area to different cells by the OAM 400, synchronization between cells can be provided. Further, by notifying the D2D radio resource that is common in the MBSFN area to each of the eNBs 200 that manage a predetermined cell, the OAM 400 can share the D2D radio resource between each cell. As a result, the inter-cell D2D service can be realized even if the inter-cell coordination is not performed by the interface between radio base stations.

Further, in the first embodiment, since the settings of the MBSFN area, where synchronization is achieved between the cells, are applied to the D2D service, the inter-cell D2D service can be implemented easily without having to perform a large-scale development.

It is noted that the OAM 400 may set the minimum required D2D radio resource for the inter-cell D2D service to the eNB 200, and the eNB 200 may set an additional radio resource for "In coverage" or "Partial coverage" depending on a load status, and may notify the same to a predetermined cell. A case in which all UEs 100 that perform a D2D service exist within a cell coverage where the D2D service is supported is called "In coverage". A case in which some UEs 100 are located in the cell coverage and the remaining UEs 100 are located outside the cell coverage is called "Partial coverage".

It is noted that the D2D radio resource in steps S103 through S106 of FIG. 9 may include only either one of the discovery resource or the communication resource.

Further, if the UE 100 exists in a cell in which an MBSFN area is set, and has an interest in the inter-cell D2D service, the UE 100 and the eNB 200 may perform the operation described below for the UE 100 to acquire the D2D radio resource. When the UE 100 performs the D2D service, the UE 100 may transmit, to the eNB 200 that manages a serving cell, a request for acquiring the D2D radio resource, as well as inter-cell D2D service interest information. The inter-cell D2D service interest information is information indicating that the UE 100 has an interest in the inter-cell D2D service. Thus, on the basis of the received inter-cell D2D service interest information, the eNB 200 decides the D2D radio resource from the resource pool that is common in the MBSFN area, and assigns the decided D2D radio resource to the UE 100.

Second Embodiment

In a second embodiment, a D2D service is implemented between cells to which a different MBSFN area has been set.

(Operation Overview)

Figure 10:
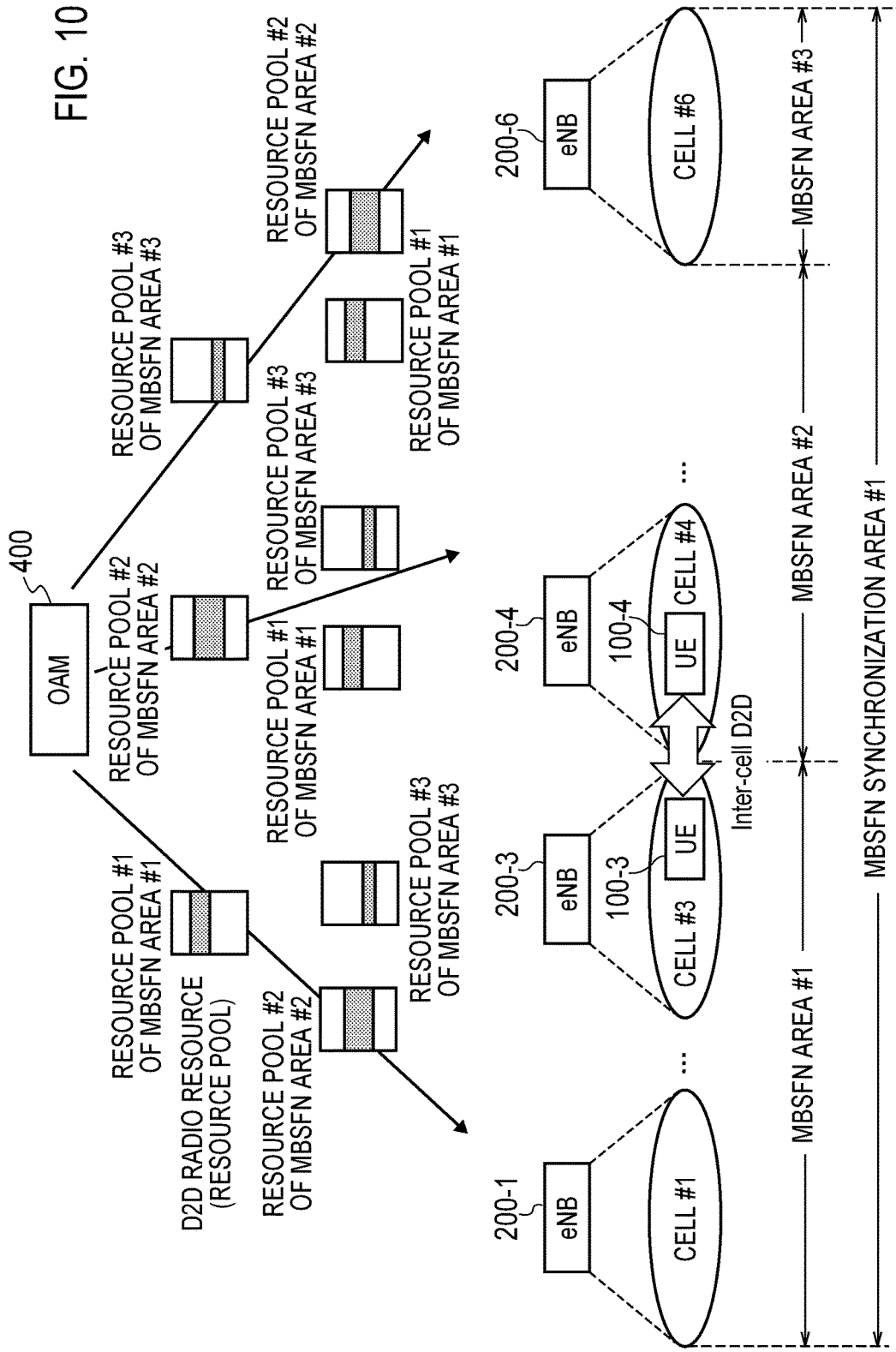
FIG. 10 is a diagram showing an operation overview according to a second embodiment.

FIG. 10 is a diagram for describing an operation overview according to the second embodiment. As shown in FIG. 10, an MBSFN area #1 is set to a cell #1, . . . , and a cell #3 managed by an eNB 200-1, . . . , and an eNB 200-3, respectively. An MBSFN area #2 is set to a cell #4, . . . , managed by an eNB 200-4, . . . . An MBSFN area #3 is set to a cell #6 managed by an eNB 200-6. An MBSFN synchronization area #1, where synchronization is achieved between the MBSFN areas, is set to the MBSFN area #1, the MBSFN area #2, and the MBSFN area #3.

In the second embodiment, the OAM 400 notifies resource pools #1, #2, and #3, which are common D2D radio resources in each of the MBSFN areas, to the eNB 200 that manages the cell to which the MBSFN areas #1, #2, and #3 are set. In addition, the OAM 400 notifies a D2D radio resource (the resource pool #2 and the resource pool #3) of an MBSFN area (the MBSFN #2 and the MBSFN #3) that is different from the MBSFN #1 within the MBSFN synchronization area #1, to the eNB 200 comprised in the MBSFN area #1. Similarly, the OAM 400 notifies a D2D radio resource (the resource pool #1 and the resource pool #3) of an MBSFN area (the MBSFN #1 and the MBSFN #3) that is different from the MBSFN #2 within the MBSFN synchronization area #1, to the eNB 200 comprised in the MBSFN area #2.

Next, the eNBs 200 broadcast the D2D radio resource notified from the OAM 400 to the cells managed by each of the eNBs 200.

Therefore, in the example shown in FIG. 10, a UE 100-3 that exists in the cell #3 and a UE 100-4 that exists in the cell #4 perform the inter-cell D2D service by using the D2D radio resource of another MBSFN area that is broadcast within each cell.

(Sequence)

Figure 11:
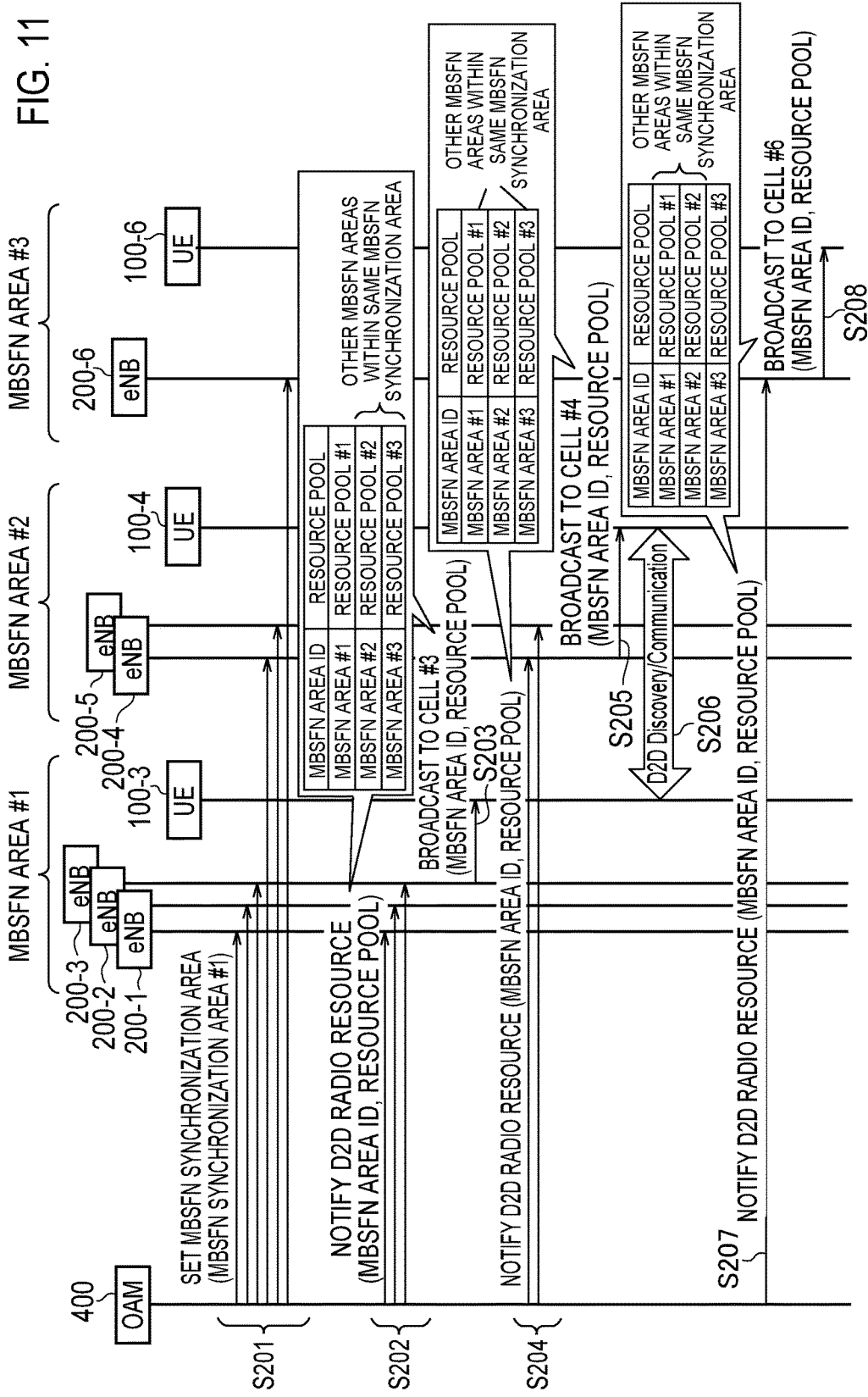
FIG. 11 is a sequence diagram according to the second embodiment.

FIG. 11 is a sequence diagram according to the second embodiment. As a prerequisite of the sequence diagram shown in FIG. 11, the MBSFN area #1 is set to the eNBs 200-1, 200-2, and 200-3, the MBSFN area #2 is set to the eNBs 200-4 and 200-5, and the MBSFN area #3 is set to the eNB 200-6. The example in FIG. 11 shows an operation procedure until the UE 100-3 that exists in the cell #3 managed by the eNB 200-3 and the UE 100-4 that exists in the cell #4 managed by the eNB 200-4 perform the inter-cell D2D service. It is noted that the number of the eNBs 200 and the MBSFN areas may be any arbitrary number.

In step S201, the OAM 400 transmits, to the eNBs 200-1 through 200-6, a signal including an MBSFN synchronization area ID (an MBSFN synchronization area #1) associated with an MBSFN area ID, and sets the MBSFN synchronization area. The eNB 200-2 sets the MBSFN synchronization area #1 on the basis of the received signal.

As a result, synchronization is achieved between the MBSFN area #1, the MBSFN area #2, and the MBSFN area #3 in which the MBSFN synchronization area #1 is set.

In step S202, the OAM 400 notifies, to the eNBs 200-1 through 200-3 that manage the cells to which the MBSFN area #1 is set, the D2D radio resource (the resource pool #1) of the MBSFN area #1, and the radio resources (the resource pools #2 and #3) of the other MBSFN areas #2 and #3 within the MBSFN synchronization area #1.

In step S203, the eNB 200-3 broadcasts the resource pools #1, #2, and #3 associated with the notified MBSFN areas #1, #2, and #3, to the cell #3 managed by the eNB 200-3. The UE 100-3 that exists in the cell #3 receives the broadcast resource pools #1, #2, and #3.

In step S204, the OAM 400 notifies, to the eNBs 200-4 and 200-5 that manage the cells to which the MBSFN area #2 is set, the D2D radio resource (the resource pool #2) of the MBSFN area #2, and the radio resources (the resource pools #1 and #3) of the other MBSFN areas #1 and #3 within the MBSFN synchronization area #1.

In step S205, the eNB 200-4 broadcasts the resource pools #1, #2, and #3 associated with the notified MBSFN areas #1, #2, and #3, to the cell #4 managed by the eNB 200-4. The UE 100-4 that exists in the cell #4 receives the broadcast resource pools #1, #2, and #3.

In step S206, the UE 100-3 performs D2D Discovery/Communication with the UE 100-4 by using the D2D radio resource (the resource pool #1) of the cell #4. Further, the UE 100-4 performs D2D Discovery/Communication with the UE 100-3 by using the D2D radio resource (the resource pool #1) of the cell #3.

Steps S207 and S208 are the operation in the MBSFN area #3 corresponding to steps S202 and S203.

As described above, according to the second embodiment, by setting an MBSFN synchronization area to different MBSFN areas, the OAM 400 can provide synchronization between the MBSFN areas. Further, by notifying, to each of the eNBs 100 that manage a predetermined cell, a radio resource of the other MBSFN areas in addition to the radio resource of the MBSFN area of the eNB 200 from the MBSFN synchronization area, the OAM 400 can share the D2D radio resource between each MBSFN area. As a result, the inter-cell D2D service can be realized even if the inter-cell coordination is not performed by the interface between radio base stations.

Third Embodiment (Operation Overview)

Figure 12:
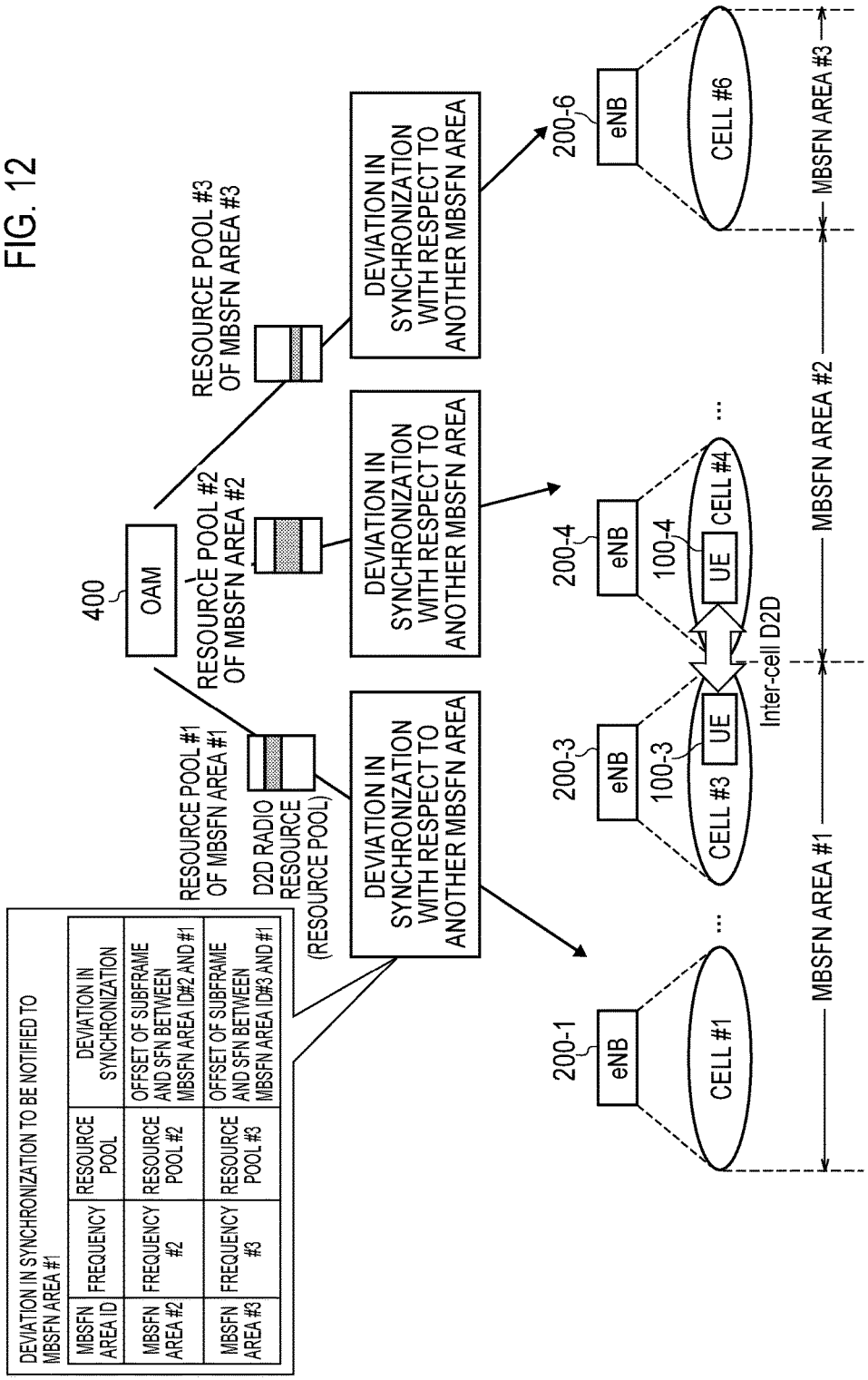
FIG. 12 is a diagram showing an operation overview according to a third embodiment.

In a third embodiment, the information notified from the OAM 400 to the eNB 200 is different from that in the second embodiment. Specifically, as shown in FIG. 12, in the third embodiment, the OAM 400 notifies, to the eNB 200, a deviation in synchronization between the MBSFN area of the eNB 200 and another MBSFN area. A deviation in synchronization is an offset to the subframe and the system frame number (SFN) between the MBSFN areas. In the example shown in FIG. 12, the OAM 400 notifies, to the eNB 200 that manages the cells to which the MBSFN area #1 is set, the deviation in synchronization between the MBSFN area #1 and the other MBSFN area #2, and the deviation in synchronization between the MBSFN area #1 and the other MBSFN area #3. Thus, on the basis of the offset between the subframe and the SFN of the MBSFN area of the UE 100, and the subframe and the SFN of another MBSFN area, the UE 100 identifies the SFN and the subframe of the other cell. This enables the execution of the inter-cell D2D service.

(Sequence)

FIG. 13 is a sequence diagram according to the third embodiment. As a prerequisite of the sequence diagram shown in FIG. 13, the MBSFN area #1 is set to the eNBs 200-1, 200-2, and 200-3, the MBSFN area #2 is set to the eNBs 200-4 and 200-5, and the MBSFN area #3 is set to the eNB 200-6. The example in FIG. 13 shows an operation procedure until the UE 100-3 that exists in the cell #3 managed by the eNB 200-3 and the UE 100-4 that exists in the cell #4 managed by the eNB 200-4 perform the inter-cell D2D service. It is noted that the number of the eNBs 200 and the MBSFN areas may be any arbitrary number.

In step S301, the OAM 400 notifies, to the eNBs 200-1 through 200-3 that manage the cells to which the MFSFN area #1 is set, a D2D radio resource (the resource pool #1) that is common in the MBSFN area #1.

In step S302, the OAM 400 notifies, to the eNBs 200-1 through 200-3 that manage the cells to which the MBSFN area #1 is set, the frequency and D2D radio resource of the other MBSFN areas #2 and #3, as well as the offset in the SFN and the subframe between the MBSFN area #1 and the other MBSFN areas #2 and #3.

In step S303, the eNB 200-3 broadcasts, to the cell #3 that the eNB 200-3 manages, the notified radio resource of the MBSFN area #1, the frequency and D2D radio resource of the MBSFN areas #2 and #3, as well as the offset between the MBSFN area #1 and the other MBSFN areas #2 and #3. The UE 100-3 that exists in the cell #3 receives the information broadcast to the cell #3.

In step S304, the OAM 400 notifies, to the eNBs 200-4 and 200-5 that manage the cells to which the MFSFN area #2 is set, a D2D radio resource (the resource pool #2) that is common in the MBSFN area #2.

In step S305, the OAM 400 notifies, to the eNBs 200-4 and 200-5 that manage the cells in which the MBSFN area #2 is set, the frequency and D2D radio resource of the other MBSFN areas #1 and #3, as well as the offset in the SFN and the subframe between the MBSFN area #1 and the other MBSFN area #1 and #3.

In step S306, the eNB 200-4 broadcasts, to the cell #4 that the eNB 200-4 manages, the notified D2D radio resource of the MBSFN area #2, the frequency and D2D radio resource of the MBSFN areas #1 and #3, as well as the offset between the MBSFN area #1 and the other MBSFN areas #1 and #3. The UE 100-4 that exists in the cell #4 receives the information broadcast to the cell #4.

In step S307, the UEs 100-3 and 100-4 estimate the D2D radio resource of the other MBSFN areas on the basis of the D2D radio resource of the MBSFN area of the UEs 100-3 and 100-4, as well as the deviation in the synchronization (the offset in the SFN and the subframe) between the MBSFN area of the UEs 100-3 and 100-4 and the other MBSFN areas. Therefore, the UE 100-3 performs D2D Discovery/Communication with the UE 100-4 by using the estimated D2D radio resource (the resource pool #2) of the cell #4. Further, the UE 100-4 performs D2D Discovery/Communication with the UE 100-3 by using the estimated D2D radio resource (the resource pool #1) of the cell #3.

As described above, according to the third embodiment, by notifying, to each of the eNBs 100 that manage a predetermined cell, the D2D radio resource of the other MBSFN areas as well as the deviation in synchronization with respect to the other MBSFN areas, in addition to the D2D radio resource of the MBSFN area of the eNB 200, the OAM 400 can share the D2D radio resource between each MBSFN area. As a result, the inter-cell D2D service can be realized even if the inter-cell coordination is not performed by the interface between radio base stations.

(Configuration of SIB Including a D2D Radio Resource)

As described above, a D2D radio resource is broadcast by being included in an existing SIB, for example, in an SIB 13, or in a new SIB for D2D. An example of the information elements of the SIB that includes the D2D radio resource is shown in FIG. 14 and FIG. 15. As shown in FIG. 14 and FIG. 15, the SIB according to the embodiment includes a list, etc. of the MBSFN areas set to the self cell and the other cells. It is noted that the downlink frequency "dl-Carrier-Freq" in the information "D2D-AreaInfo-r12" of the self cell according to the example shown in FIG. 14 may be an uplink frequency.

It is noted that the "neighArea-TimeGapInfoList", "offset-Subframe", and "offset-SFN" may either not be included or may not be set to the information elements of the SIB according to the first embodiment and the second embodiment.

OTHER EMBODIMENTS

In the embodiments described above, although an LTE system is described as an example of a mobile communication system, it is not limited to the LTE system, and the present invention may be applied to a system other than the LTE system.

The entire content of Japanese Patent Application No. 2014-059280 (filed on Mar. 20, 2014) is incorporated in the present specification by reference.

INDUSTRIAL APPLICABILITY

The present invention is useful in the field of radio communication such as mobile communication.

The invention claimed is:

1. A communication control method for performing device-to-device communication between different cells managed by a radio base station connected to an upper network apparatus, comprising:
    setting, by the upper network apparatus, to a predetermined cell managed by the radio base station, an MBSFN (Multimedia Broadcast Multicast service Single Frequency Network) area where synchronization is achieved between a plurality of cells;
    notifying, by the upper network apparatus, to the radio base station, a first radio resource that is common in the MBSFN area, and that is used for performing the device-to-device communication;
    broadcasting, by the radio base station, the first radio resource in the predetermined cell;
    notifying, by the upper network apparatus, to the radio base station, a second radio resource that is common in a different MBSFN area that is different from the MBSFN area, as well as a deviation in synchronization between the MBSFN area and the different MBSFN area, wherein the second radio resource is used for performing the device-to-device communication; and
    broadcasting, by the radio base station, the second radio resource, as well as the deviation in synchronization, in the predetermined cell.

2. The communication control method according to claim 1, wherein
    the first radio resource includes a discovery resource used for a discovery of a proximal terminal that performs the device-to-device communication, and a communication resource used in the device-to-device communication.

3. The communication control method according to claim 1, wherein
    the first radio resource includes a discovery resource used for a discovery of a proximal terminal that performs the device-to-device communication, and
    the radio base station notifies, to the predetermined cell, a communication resource used in the device-to-device communication, which is decided depending on a load status of the predetermined cell.

4. The communication control method according to claim 1, wherein
    the first radio resource is associated with MBSFN area identification information that identifies the MBSFN area, in the notifying, the upper network apparatus notifies the MBSFN area identification information that is associated with the first radio resource, and in the broadcasting, the radio base station broadcasts the MBSFN area identification information that is associated with the first radio resource.

5. An upper network apparatus connected to a radio base station that manages different cells in which device-to-device communication is performed, comprising:

a controller configured to set an MBSFN (Multimedia Broadcast Multicast service Single Frequency Network) area, where synchronization is achieved between a plurality of cells, to a predetermined cell managed by the radio base station, wherein the controller is configured to notify, to the radio base station, a first radio resource that is common in the MBSFN area, and that is used for performing the device-to-device communication, and the controller is configured to notify, to the radio base station, a second radio resource that is common in a different MBSFN area that is different from the MBSFN area, as well as a deviation in synchronization between the MBSFN area and the different MBSFN area.

6. A radio base station that manages different cells in which device-to-device communication is performed, wherein an MBSFN (Multimedia Broadcast Multicast service Single Frequency Network) area, where synchronization is achieved between a plurality of cells, is set to a predetermined cell managed by the radio base station, the radio base station comprises a controller configured to broadcast, in the predetermined cell, a first radio resource that is notified from an upper network apparatus connected to the radio base station, and that is common in the MBSFN area, and that is used for performing the device-to-device communication, and the controller is configured to receive, from the upper network apparatus, a notification indicating a second radio resource that is common in a different MBSFN area that is different from the MBSFN area, as well as a deviation in synchronization between the MBSFN area and the different MBSFN area, the controller is configured to broadcast, the second radio resource, as well as the deviation in synchronization, in the predetermined cell.

* * * * *